March 31, 1959

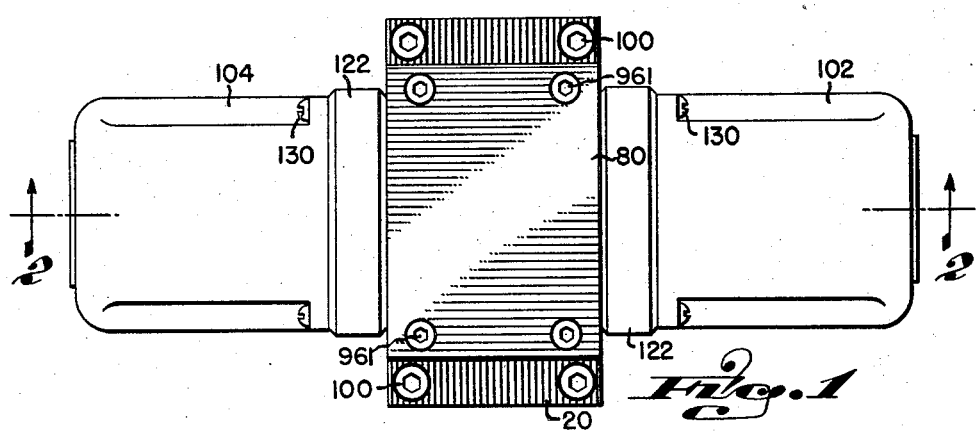
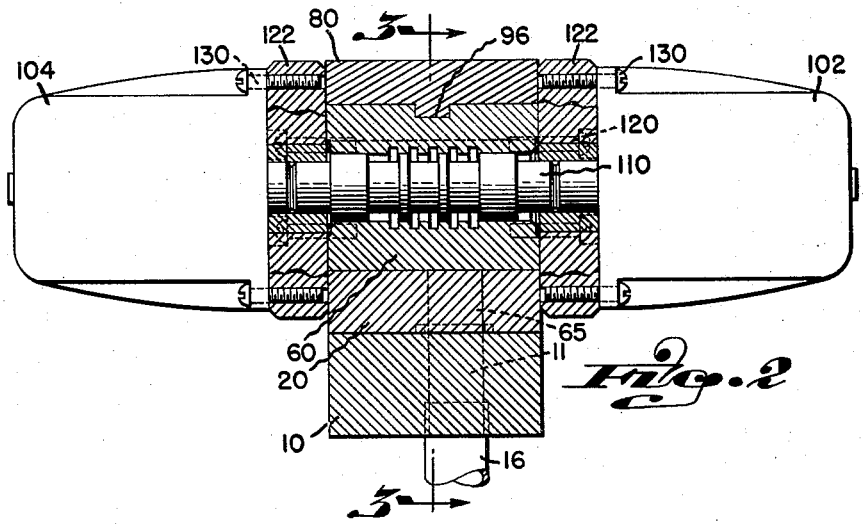
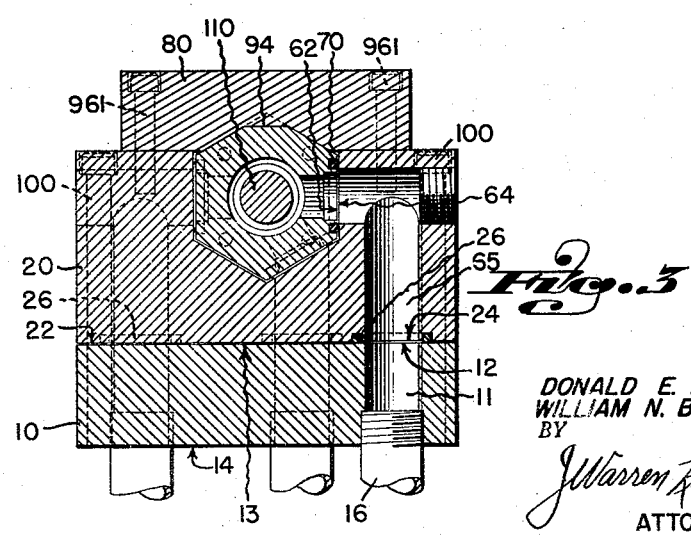

D. E. BECKETT ET AL 2,879,788

MANIFOLD MOUNTED VALVE

Filed April 7, 1955

INVENTORS
DONALD E. BECKETT
WILLIAM N. BECKETT
BY
J. Warren Kinney, Jr.
ATTORNEY

United States Patent Office 2,879,788
Patented Mar. 31, 1959

2,879,788

MANIFOLD MOUNTED VALVE

Donald E. Beckett and William N. Beckett, Wilmington, Ohio, assignors to Beckett-Harcum Co., Wilmington, Ohio, a corporation of Ohio Application April 7, 1955, Serial No. 499,920

4 Claims. (Cl. 137—454.6)

This invention relates to a manifold mounted valve.

An object of the invention is to provide a manifold mounted valve of the type which includes a manifold block and a valve body which is adapted to be securely though releasably associated with the manifold block for enabling the valve body to be quickly removed from the block for facilitating inspection, repair, replacement or the like.

Another object of the invention is to provide a manifold mounted valve which comprises a manifold block to which fluid connections may be made, and a valve body adapted to be securely though releasably associated with the manifold block; and wherein the block and valve body are provided with complementary faces having axially aligned ports therein, said valve body including individual sealing members surrounding its respective ports, which members are circumscribingly engageable with corresponding ports in complementary faces of the manifold block for effecting a fluid tight fit between the ports.

These and other objects are attained by the means described herein and as disclosed in the accompanying drawings, in which:

Fig. 1 is a top plan view of a manifold mounted valve embodying the teachings of the present invention.

Fig. 2 is a partial sectional view of Fig. 1 taken on line 2—2 thereof.

Fig. 3 is a sectional view taken on line 3—3 of Fig. 2.

Figure 4:
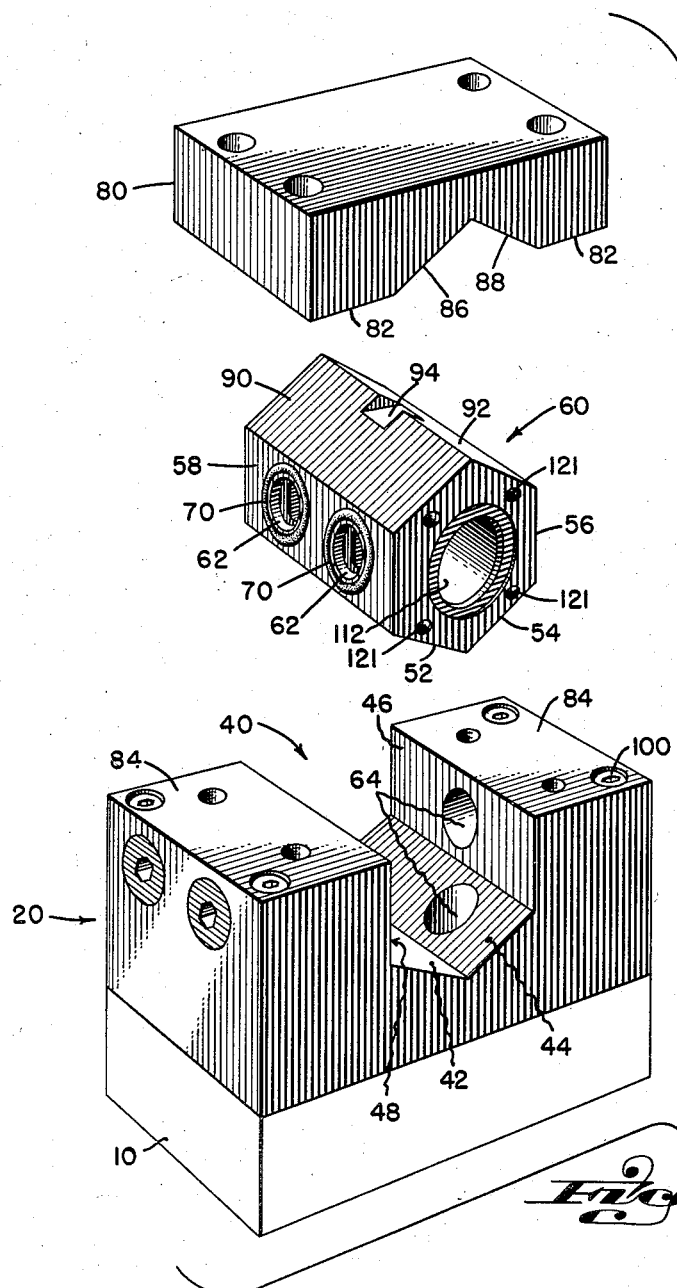
Fig. 4 is an exploded view of the three basic elements of a valve embodying the teachings of the present invention.

With particular reference now to Figs. 3 and 4, the numeral 10 denotes a terminal block provided with a plurality of bores 11 which terminate in ports 12 in its upper, flat, axial face 13. The opposite or lower face 14 of the terminal block is provided with suitably tapped openings engageable by fluid lines 16 which are thereby fixedly disposed in fluid tight connection with the bores 11 which terminate in ports 12.

The numeral 20 denotes a manifold block having a flat, axial, lower face 22 provided with ports 24 which are adapted to be disposed in axial alignment with ports 12 of the terminal block. As best illustrated in Fig. 3, a sealing member 26 in the form of an O-ring circumscribes each of the ports of and is carried by the manifold block whereby a fluid tight fit will be provided between the corresponding aligned ports of the terminal and manifold blocks when the manifold block has been drawn against the terminal block by means of bolts 100.

As best illustrated in Fig. 4, the manifold block is provided with an open-ended slot denoted generally by the numeral 40, said slot being defined by a plurality of flat, axial walls 42, 44, 46 and 48, which are dimensioned whereby to loosely receive the corresponding flat, axial walls 52, 54, 56 and 58 of a valve body denoted generally by the numeral 60.

Individual ports 62 are provided in one or more of the walls 52, 54, 56 and 58 of the valve body, said ports being disposed in axial alignment with ports 64 provided in corresponding walls 42, 44, 46 and 48 of slot 40.

It will, of course, be understood that each of the ports 64 in walls 42, 44, 46 and 48 of the manifold block are suitably connected as by passageways 65 to a corresponding port 24.

A sealing member 70 circumscribes each of the various ports 62 of the valve body, said members being secured to, carried by and projecting from those respective faces of the valve body in which the valve ports 62 are located. The sealing members 70 are adapted to abuttingly engage and be compressed by corresponding faces of the slot of the manifold block incident to insertion of the valve body into slot 40 whereby the sealing members of the various ports in the walls of the valve body will circumscribe the axially aligned ports 64 in the manifold block for thereby providing a fluid tight fit between corresponding ports.

It should be noted that sealing members 70 comprise the sole means for establishing the fluid tight connection between the ports of the valve body and manifold block.

In the preferred embodiment of the invention a cap member 80 is provided, said cap including means for engaging the valve body for accurately positioning it relative to the manifold block and for securely though releasably anchoring the valve body relative to the manifold block. As best illustrated in Figs. 2 and 4, cap 80 includes lower axial faces 82 which are adapted to abuttingly engage upper faces 84 of the manifold block. A channelway defined by walls 86 and 88 is provided through cap 80, said walls being complementary to walls 90 and 92 of the valve body. A slot 94 is provided as illustrated in Fig. 4 to receive a key 96 formed integral with cap 80 and extending across the apex of walls 86 and 88, said key is adapted to snugly engage slot 94 for insuring proper alignment of valve body 60 relative to manifold block 20 when cap 80 has been secured to the manifold block such as by means of bolts 961, note Figs. 1 and 3.

Figure 6:
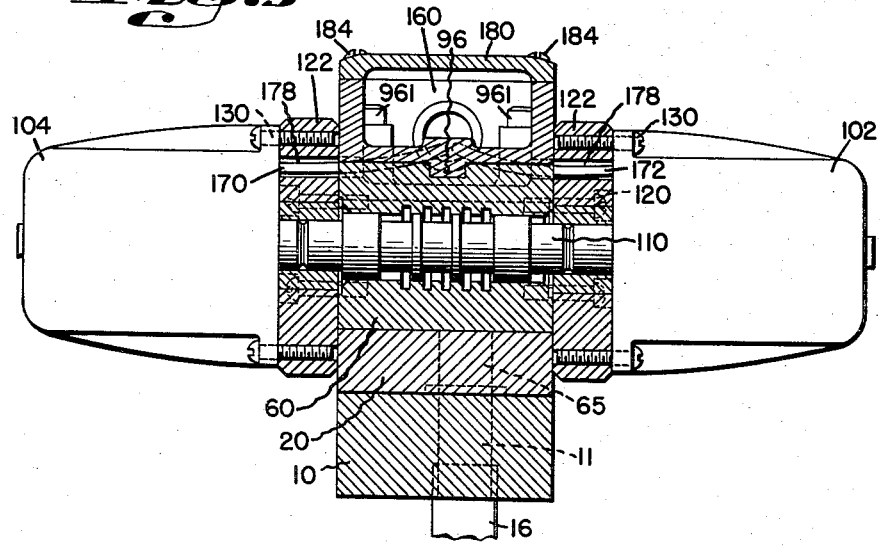
Fig. 6 is a view similar to Fig. 2 but with cap 80 replaced by the combination terminal block and anchor cap of Fig. 5.

It should, of course, be understood that the valve body 60 will include suitable valving means which may be operated manually, mechanically or electrically for selectively controlling the flow of fluid through lines 16. In Figs. 1, 2 and 6 electrical means in the form of solenoids housed within covers 102 and 104 have been provided for imparting axial movement to an axially shiftable spool 110 received within axial bore 112 of the valve body.

As clearly evident from Figs. 1, 2 and 6, the valve actuating means contained within covers 102 and 104 are secured to and carried by the opposite ends of valve body 60 by means of fastening means such as bolts 120 extending through end plates 122, bolts 120 being receivable in internally threaded bores 121 of the valve body, the valve actuating equipment being secured to and carried by end plates 122. Cover members 102 and 104 may be secured as by means of fastening means 130 to end plates 122.

Figure 5:
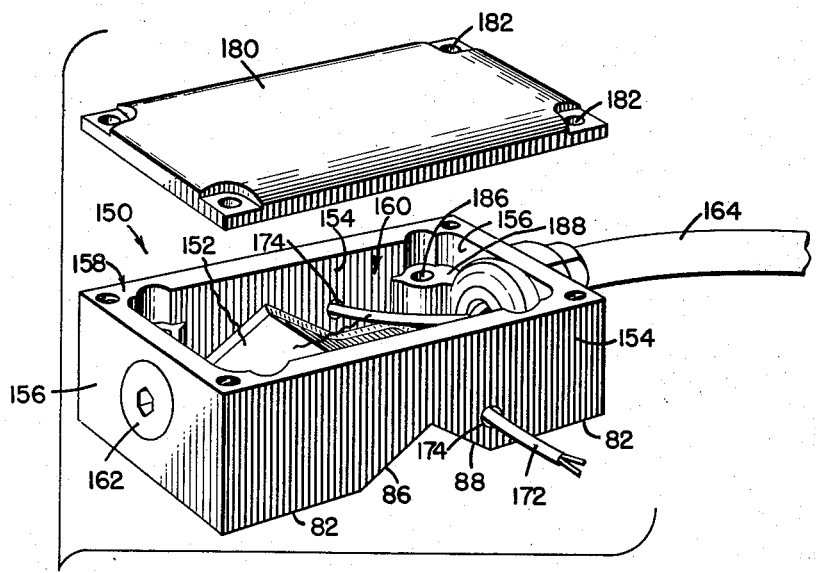
Fig. 5 is a perspective view of a combination terminal block and anchor cap comprising a detail of the invention.

With particular reference now to Figs. 5 and 6, the numeral 150 denotes a combination terminal block and anchor cap having lower axial faces 82 and a channelway 152 defined by walls 86 and 88, which faces and walls are counterparts of faces 82 and walls 88 and 86 of the cap of Fig. 4; and laterally spaced side and end walls 154 and 156, respectively, which project upwardly for providing an open-topped chamber 160 having a peripheral upper edge 158. End walls 156 are provided with suitable openings for receiving an electrical conduit 164. A closure element 162 may be provided to close the unused aperture.

The solenoid control wires 170 and 172 housed within conduit 164 are easily accessible within chamber 160, said wires being led to the solenoids through openings 174 in side walls 154 aligned with openings 178 in plates 122, note Fig. 6.

The combined terminal block and anchor cap may be anchored to the manifold block by means of bolts 961 received in the axial bores 186 or corner bosses 188, it being understood that the combination terminal block and anchor cap will serve to securely though releasably dispose the valve body with the manifold block in the same manner as plate 80.

A cover plate 180 having apertures 182 for the reception of retaining means 184 is adapted to close the open upper end of the terminal block as best illustrated in Fig. 6.

From the foregoing, it will be noted that all of the operative parts of the valve are thus secured within or to, and are carried by, valve body 60, which may be bodily removed from the manifold block incident to loosening of and removal of cap 80, or removal of the combination terminal block and anchor cap 150, thereby enabling the valving mechanism to be quickly removed from or associated with the manifold block without requiring the use of plumbing tools.

If desired, the terminal block 10 may be eliminated, in which case lines 16 would be fixedly secured directly to the lower portion of the manifold block.

Uniformly excellent results have been obtained in those instances wherein sealing members 70 comprise O rings secured to, carried by, and which project outwardly from the axial faces of the valve block 60, it being understood that the said sealing members are subjected to compressive forces when the valve block is received within the slot of the manifold block.

Various changes and modifications may be made in the structural details of the device, within the scope of the appended claims, without departing from the spirit of the invention.

What is claimed is:

1. A manifold mounted valve comprising a hexagonally shaped valve body having ports in one pair of its parallel walls and in each of the two walls that converge from the lower edges of the said parallel walls, a manifold block having an open topped recess therein defined by a pair of laterally spaced parallel walls and a pair of downwardly convergent connecting walls, the walls of said recess having ports corresponding to the ports in the complementary walls of the valve body, sealing members circumscribing the individual ports of and carried by the valve body, said valve body receivable in the recess of said manifold block with the ports of the valve in axial alignment with the ports of the manifold block and with the sealing members providing a fluid tight connection between corresponding ports, and means carried by the manifold block for releasably anchoring the valve block thereto.

2. A manifold mounted valve comprising a valve body including valving means, a manifold block having a valve body receptive slot therein, said body and slot having complementary faces provided with aligned ports, individual sealing members secured to, surrounding the ports of, and projecting outwardly from the faces of the valve body, said sealing members adapted to engage and be compressed by the walls of the slot and circumscribe the ports therein, an anchor cap having end portions adapted to be releasably secured to the manifold block, and a central portion adapted to spanningly engage the valve body received in the said valve-body receptive slot of the manifold block, interfitting means on the valve body and anchor cap for positively locating the valve body relative to the manifold block for disposing the corresponding ports of the block and body in axial alignment when the anchor cap is secured to the block.

3. A manifold mounted valve comprising a manifold block having a slot formed in an upper flat surface thereof and defined by at least two parallel flat walls, a valve body having at least two parallel flat outer side walls, said walls of the slot and said walls of the body being in face to face relationship, certain of said outer side walls of the valve body and said walls of the slot being provided with complementary axially aligned ports, individual sealing members circumscribing each of the ports of and carried by the valve body, said valve body loosely receivable in the slot of the manifold block for disposing the ports in the parallel side walls of the valve body in axial alignment with the ports of the parallel walls of the manifold slot, said sealing members spanning the adjacent walls of the valve body and the slot for providing a fluid tight connection between corresponding ports, and means connected to said upper surface of the manifold block and engaging the valve body for releasably anchoring said valve body to said manifold block.

4. A manifold mounted valve comprising a manifold block having an open end slot defined by at least two parallel flat walls, a valve body having at least two parallel flat outer side walls in face to face relation with said last mentioned parallel walls, certain of said side walls of the valve body and said walls of the slot being provided with complementary axially aligned ports, individual sealing members comprising O-rings circumscribing each of the ports of and carried by and projecting outwardly from the parallel side walls of the valve body, said valve body loosely receivable in the slot of the manifold block for disposing the ports in the parallel side walls of the valve body in axial alignment with the ports of the parallel walls of the manifold slot, said sealing members being compressed by and spanning the adjacent walls of the valve body and slot for providing a fluid tight connection between corresponding ports, and means on the manifold block spanningly engaging the valve body for releasably anchoring it thereto.

References Cited in the file of this patent
UNITED STATES PATENTS

| | | |
|---|---|---|
| 1,120,713 | Hennessy | Dec. 15, 1914 |
| 2,034,122 | Terry | Mar. 27, 1936 |
| 2,401,397 | Wright | June 4, 1946 |
| 2,427,439 | Brown | Sept. 16, 1947 |
| 2,437,723 | Bryant | Mar. 16, 1948 |
| 2,600,746 | Ernst | June 17, 1952 |
| 2,604,293 | Phillips | July 22, 1952 |
| 2,655,940 | Jackson | Oct. 20, 1953 |